United States Patent
King et al.

(10) Patent No.: US 7,481,068 B2
(45) Date of Patent: Jan. 27, 2009

(54) METHOD FOR THE STORAGE OF DEEP-FROZEN GOODS

(75) Inventors: Wilfried King, Ochsenhausen (DE); Matthias Wiest, Ochsenhausen (DE); Helmut Bauer, Lienz (AT); Thomas Ertel, Leutkich (DE)

(73) Assignee: Liebherr-Hausgeräte Ochsenhausen GmbH, Ochsenhausen (DE)

( * ) Notice: Subject to any disclaimer, the term of this patent is extended or adjusted under 35 U.S.C. 154(b) by 433 days.

(21) Appl. No.: 11/009,230

(22) Filed: Dec. 10, 2004

(65) Prior Publication Data
US 2005/0155370 A1    Jul. 21, 2005

(30) Foreign Application Priority Data
Dec. 10, 2003  (DE)  ............... 103 57 778
Jul. 19, 2004  (DE)  ............... 10 2004 034 869

(51) Int. Cl.
*F25B 1/00*  (2006.01)
*F25B 49/00*  (2006.01)

(52) U.S. Cl. ..................... 62/228.1; 62/228.4

(58) Field of Classification Search ............ 62/228.1, 62/228.4, 228.5, 259.2, 186, 222
See application file for complete search history.

(56) References Cited

U.S. PATENT DOCUMENTS 4,841,737  A     6/1989  Fujii et al.

FOREIGN PATENT DOCUMENTS

| DE | 3816500 | | 12/1988 |
| GB | 2225630 A | * | 6/1990 |
| JP | 10197127 A | * | 7/1998 |
| JP | 2001-056173 | | 2/2001 |
| JP | 2002039660 A | * | 2/2002 |

* cited by examiner

*Primary Examiner*—Chen-Wen Jiang
(74) *Attorney, Agent, or Firm*—Dilworth & Barrese LLP

(57) ABSTRACT

The invention relates to a method for the storage of deep-frozen goods in a freezer having a speed-controlled compressor. In accordance with the invention, the compressor is operated in long-term operation and the temperature is lowered in a low-temperature mode to a temperature which is clearly below −18° C., and is kept substantially constant at this selected temperature with only low temperature fluctuations which are caused by a change in speed of the compressor.

23 Claims, 2 Drawing Sheets

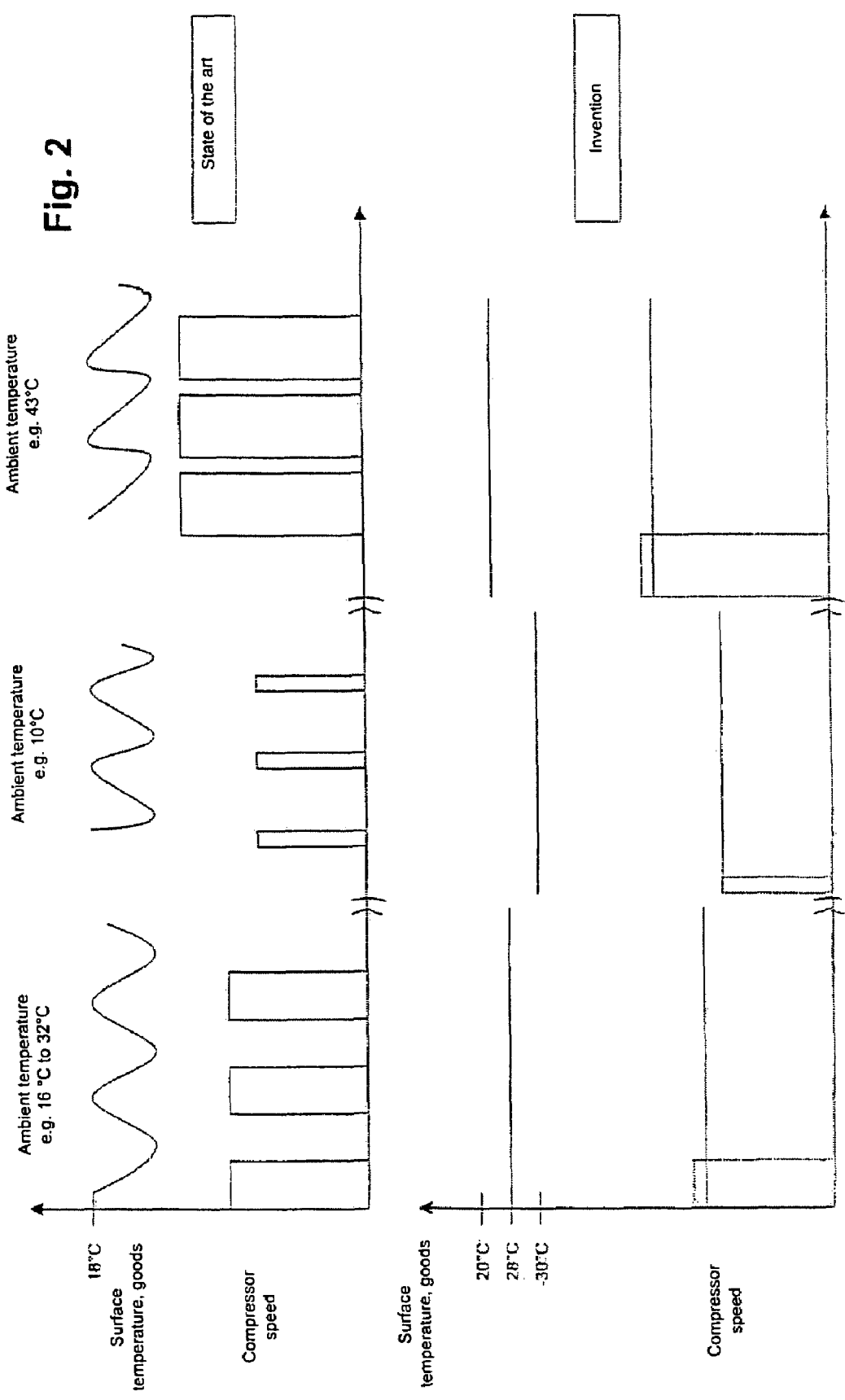

METHOD FOR THE STORAGE OF DEEP-FROZEN GOODS

BACKGROUND OF THE INVENTION

The invention relates to a method for the storage of deep-frozen goods in a freezer having a speed-controlled compressor.

In domestic freezers, the goods are usually stored at a temperature of approximately −18° C. or at slightly lower temperatures. This temperature value is the temperature which can be measured at the hottest position in the freezer at the core of the goods stored there. The compressor usually has an ON/OFF control which is controlled by means of temperature sensors which detect the inner temperature of the freezer space. This ON/OFF control results in temperature fluctuations inside the goods and in particular at their surfaces. The ON/OFF control is also used when speed-controlled compressors are used. Before the compressor is switched off, it is admittedly throttled down to the lowest possible speed, but a switching off of the compressor is not thereby prevented. The reason for this is that the ratio which can be established in practice from the highest to the lowest speed is too low in order to achieve long-term operation at −18° C., on the one hand, and to ensure a sufficient cold output when the highest permitted ambient temperature is present, on the other hand. The ratio which can be established from the highest to the lowest speed of the compressor would have to be much larger here. This cannot be realized from a technical machine aspect.

In order to still have a sufficient performance reserve even for high ambient temperatures, it is necessary to give the compressor correspondingly large dimensions. One is thereby forced to use an ON/OF control at normal ambient temperatures in order to obtain a freezer space temperature of −18° C. This ON/OFF control results in conventional compressors in switching cycles of e.g. 3/h or, when speed-controlled compressors are used, of 1/h. The deep-frozen goods are exposed to temperature fluctuations by these ON/OFF processes and the quality of the deep-frozen goods suffers from this.

SUMMARY OF THE INVENTION

It is the object of the present invention to further develop a method for the storage of deep-frozen goods in a freezer in accordance with the preamble of claim 1 such that the quality of the deep-frozen goods is improved with the same storage time and such that the possible storage time is noticeably extended.

In accordance with the invention, the object is solved by a method having the features herein. A method is provided here for the storage of deep-frozen goods in a freezer having a speed-controlled compressor in which the compressor is operated in long-term operation and in which the temperature is lowered in a low-temperature mode to a temperature which is clearly below −18° C., and is kept substantially constant at this selected temperature with only slight temperature fluctuations which are caused by a change in speed of the compressor.

This method in accordance with the invention is based on the following findings:

On temperature fluctuations, the formation of large ice crystals in the deep-frozen goods is accelerated. This is connected to the fact that small ice crystals have a higher vapor pressure than large ice crystals. As a result of the vapor pressure drop between small ice crystals and large ice crystals, the large crystals can grow at the cost of the small crystals. These large crystals result, e.g. in deep-frozen ice-cream, in a sensory degradation of quality. The creamy consistence (small ice crystals) is increasingly felt to be gritty (large ice crystals). This procedure is substantially accelerated by temperature differences between the crystals. What is decisive for the procedure of recrystallization is the magnitude of the temperature fluctuation and the frequency thereof per time unit. The invention utilizes this finding in that it avoids the temperature fluctuations which are induced by the switching on and off of the compressor. To achieve this, the temperature is lowered substantially further than the previously customary −18° C. This has the additional result that, with any minimum temperature fluctuations still present, the driving vapor pressure difference is additionally reduced. It namely applies that the driving vapor pressure difference falls with the same temperature fluctuation when the temperature level is lowered.

The formation of so-called freezer burn in the corresponding frozen good with a packaging not contacting the good is furthermore avoided by the large avoidance of the temperature fluctuations. The bloom layer forming at the interior of the surface of the packaging is also avoided. This freezer burn usually arises by water loss due to breathing. It must be taken into account in this process that, in the event the temperature in a freezer falls, with packed goods, the temperature of the packaging material is initially lower than that of the packed goods. The goods likewise adopt the temperature of the packaging or of the environment with a time offset. Due to the higher temperature prevailing over a specific period of time, the water vapor pressure is also higher over the goods than over the inner side of the packaging for a certain period of time. Water vapor therefore exits the goods and condenses at the inner surfaces of the packaging; at the same time, a recrystallization is initiated at the interior of the goods, that is small crystals disappear and large crystals are formed.

On the reversal of the temperature fluctuation, that is when the temperature in the environment of the goods increases again, the goods temperature again lags behind. In this phase, the interior of the goods is the colder system. A back diffusion of the water vapor is, however, not possible. The water vapor is precipitated at the surface of the good in the form of ice.

On a renewed lowering of temperature in the environment of the goods, a diffusion of water vapor again takes place from the interior of the goods to the outside. With a plurality of such interplays in the temperature development, the outer zones of the goods become practically free of ice—freezer burn forms, that is drying out, loss of color and loss of volatile substances. A bloom layer forms at the inner surface of the packaging. No water vapor can exit the goods at points at which the packaging has a tight contact. Large ice crystals form here in marginal zones.

These aforesaid disadvantages are likewise suppressed by the method in accordance with the invention, since the temperature can be kept constant and the temperature interplays which can result in drying out are effectively suppressed.

Finally, the invention adopts the so-called van't Hoff rule. This states that the reaction speed more than doubles at a temperature increase of 10 K. If this is transferred to the freezing sector, it means that by the lowering of the temperature of a good by 10 K, an extension of the storage time by a factor of two is achieved. This statement applies to the temperature range of lower than −20° C. The storage period can therefore be improved by a corresponding lowering of the temperature level to a substantially colder temperature than −18° C. On a temperature lowering to −28° C., it can be assumed that the storage period can double in dependence on the product, with the maintenance of quality being correspondingly higher with the same storage period.

Further advantageous aspects of the invention result from herein. The temperature in the low-temperature mode can accordingly advantageously be at least −28° C.

A low temperature mode for storage in a freezer at temperatures of at least −28° C. can advantageously be selected by means of an actuation means, for example by means of a switch.

The compressor can advantageously always be operated in long-term operation at the lowest possible speed at the selected low-temperature mode by a logic control system. When the compressor has an output excess, it is nevertheless determined via a corresponding logic control system that the compressor runs continuously at its lowest possible speed even if a temperature below the selected low temperature is adopted. A constant temperature is then adopted below the selected low temperature. What is important here is that the low temperature is constantly maintained and no temperature fluctuations occur. This mentioned condition will in particular arise in winter when the ambient temperature of the appliance is lower than the ambient temperature in summer. A leveling to a lower temperature than the selected low temperature does not influence the quality of the deep-frozen good so that a leveling to this lower temperature can be accepted.

In accordance with a further advantageous aspect of the invention, the selected low temperature in the appliance is automatically controlled back via a corresponding logical control system on temperature changes. These temperature changes result, for example, on the opening and closing of the freezer. The logic control system increases the compressor output after a heat incident so that the selected low temperature is again reached as fast as possible.

BRIEF DESCRIPTION OF THE DRAWINGS

Further details and advantages of the invention will be explained in the following with reference to an example:

in which FIG. 1 schematically illustrates a flowchart of an optimized storage system in accordance with the present invention; and FIG. 2 illustrates graphs comparing performance of the system of the present invention with a prior art system.

DESCRIPTION OF THE PREFERRED EMBODIMENTS

Figure 1:
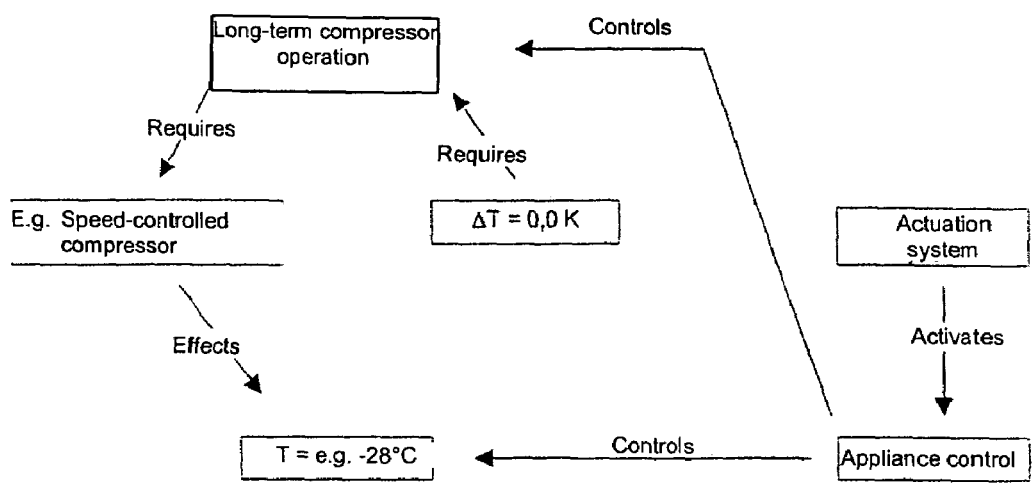

A flowchart of the optimized storage system is shown in FIG. 1. An appliance control for the freezer can be activated via an actuation system. A long-term operation of the compressor is controlled via the appliance control. To eliminate the temperature differences, the continuous operation of the compressor is required, on the one hand. On the other hand, the speed of the compressor is controlled such that a constant temperature at, for example, −28° C. is adopted.

The use of a speed-controlled compressor operated in long-term operation results in a constant temperature at the inner space of the freezer. The temperature control keeps the temperature in the inner space constant by a continuously adapted speed or by a speed adapted in stages. The ON/OF control, which results in temperature fluctuations which are too large, is eliminated in accordance with the invention. This type of control is made possible by the lowering of the temperature to e.g. −28° C. This temperature level permits a constant temperature maintenance without fluctuation in a wide range of ambient temperature from e.g. 16° C. to 32° C.

In an operation such as was known in the prior art at −18° C., it would have to be accepted on a long-term operation of the compressor that corresponding performance losses arise at higher ambient temperatures.

If there is a departure from the large fluctuation range between 16° C. and 32° C. in the system in accordance with the invention, the following results:

If the ambient temperature should fall, for example, below 16° C. and a switching off of the compressor become necessary so that the inner temperature does not fall below e.g. −28° C., the compressor is further operated at the lowest speed stage in accordance with the invention. While this results in a lower inner temperature, it only has a positive effect on the quality of the goods when taking van't Hoff's rule into account and is therefore acceptable.

If the ambient temperature should increase, for example, above 32° C., the inner temperature will increase to a maximum of −18° C., which corresponds to a better storage quality than with conventional appliances since no short-term temperature fluctuations arise by switching the appliance on and off.

These temperature changes in the inner space of the freezer occurring due to a great change in the ambient temperature only occur very rarely, however; for instance, in comparison between summer and winter. This is a temperature change in the inner space which does not include the customary temperature fluctuations of the switching on and off which result in the aforesaid negative phenomenon of freezer burn or of recrystallization into larger ice crystals. This situation of the invention is shown in overview with respect to that in accordance with the prior art in FIG. 2. The upper part of FIG. 2 shows the surface temperature of the frozen goods in dependence on the speed of the compressor, that is in dependence on the switching on and off states of the compressor in accordance with the prior art at the customary ambient temperatures of the freezer between, for example, 16° C. and 32° C. The clear temperature fluctuations are shown here which have the aforesaid negative consequences. Similar fluctuations result on the departure from the temperature range in the left hand part of the diagram when the ambient temperature falls, for example, to −10° C. Here, the compressor is controlled in each case at a lower speed for shorter times. Nevertheless, the temperature fluctuation results similar to the left hand part of the diagram. At the far right in the upper diagram in accordance with the prior art, the speed of the compressor is entered for a high ambient temperature which in turn results in a strong temperature fluctuation at the surface of the deep-frozen goods.

In contrast, the invention shows in the lower diagram how a constant temperature of −28° C. is adopted with a uniform running of the compressor speed for the customary ambient temperature range of 16° C. to 32° C. If the ambient temperature falls to 10° C., the total temperature level is lowered to, for example, −30° C., which, however, results in the positive effect that the speed of the compressor can be kept constant. If the ambient temperature rises to the extremely high temperature range of 43° C., the speed of the compressor increases, whereas the low temperature, however, still remains constant. A temperature of approximately −20° C. is still achieved hereby, for example, which, however, again remains constant.

The invention claimed is:

1. A method for the storage of deep-frozen goods in a freezer having a speed-controlled compressor, comprising the steps of operating the compressor in long-term operation, lowering temperature in a low-temperature mode to a temperature clearly below −18° C., maintaining substantially constant this selected temperature clearly below −18° C. with only small temperature fluctuations solely caused by a change in speed of the compressor, and lowering the temperature from −18° C. to −28° C. to double storage period by a factor of two.

2. A method in accordance with claim 1, wherein the temperature in the low-temperature mode is at least −28° C.

3. A method in accordance with claim 1, wherein the compressor is always operated at the lowest possible speed in long-term operation at the selected low-temperature mode by a logic control system.

4. A method in accordance with claim 1, wherein the selected low temperature in the appliance is controlled again on a temperature change via a logic control system.

5. A method in accordance with claim 1, wherein freezer burn on, formation of a bloom layer on, drying out of and loss of color and volatile substances from goods within packaging stored in the freezer, are all avoided.

6. A method in accordance with claim 1, wherein the temperature in the low-temperature mode is at least −28° C.

7. A method in accordance with claim 1, comprising the additional step of maintaining the compressor in operation throughout all temperature fluctuations with the freezer.

8. A method in accordance with claim 1, wherein driving pressure fluctuation is also reduced.

9. A method for the storage of deep-frozen goods in a freezer having a speed-controlled compressor, wherein the compressor is operated in long-term, operation, the temperature is lowered in a low-temperature mode to a temperature which is clearly below −18° C., and is kept substantially constant at this selected temperature with only low temperature fluctuations which are caused by a change in speed of the compressor, and the compressor runs on constantly at a low speed in the presence of an output excess, even if a temperature below the selected low temperature is adopted.

10. A method in accordance with claim 9, wherein the mode for storage at temperatures of at least −28° C. (low temperature mode) is selected by an actuation means.

11. A method in accordance with claim 9, wherein the compressor is always operated at the lowest possible speed in long-term operation at the selected low-temperature mode by a logic control system.

12. A method in accordance with claim 9, wherein the selected low temperature in the appliance is controlled again on a temperature change via a logic control system.

13. A method in accordance with claim 9, comprising the additional step of maintaining the compressor in operation throughout all temperature fluctuations with the freezer.

14. A method in accordance with claim 13, wherein driving pressure fluctuation is also reduced.

15. A method in accordance with claim 9, wherein driving pressure fluctuation is also reduced.

16. A method in accordance with claim 9, wherein freezer burn on, formation of a bloom layer on, drying out of and loss of color and volatile substances from goods within packaging stored in the freezer, are all avoided.

17. A method for the storage of deep-frozen goods in a freezer having a speed-controlled compressor, comprising the steps of operating the compressor in long-term operation, lowering temperature in a low-temperature mode to a temperature clearly below −18° C., maintaining substantially constant this selected temperature clearly below −18° C. with only small temperature fluctuations solely caused by a change in speed of the compressor, operating in an ambient temperature range of 16° C.-32° C., and constantly operating the compressor to control temperature level within the freezer between −20° C. and −30° C. should the ambient temperature rise above or below the range of 16° C.-32° C.

18. A method in accordance with claim 17, wherein the selected low temperature in the appliance is controlled again on a temperature change via a logic control system.

19. A method in accordance with claim 17, wherein freezer burn on, formation of a bloom layer on, drying out of and loss of color and volatile substances from goods within packaging stored in the freezer, are all avoided.

20. A method in accordance with claim 17, wherein the temperature in the low-temperature mode is at least −28° C.

21. A method in accordance with claim 17, wherein the compressor is always operated at the lowest possible speed in long-term operation at the selected low-temperature mode by a logic control system.

22. A method in accordance with claim 17, comprising the additional step of maintaining the compressor in operation throughout all temperature fluctuations with the freezer.

23. A method in accordance with claim 17, wherein driving pressure fluctuation is also reduced.

* * * * *